United States Patent
Kiriyama

[11] Patent Number: 5,729,210
[45] Date of Patent: Mar. 17, 1998

[54] REMOTE OPERATING SYSTEM

[75] Inventor: Tetsuaki Kiriyama, Kanagawa, Japan

[73] Assignee: Sony Corporation, Japan

[21] Appl. No.: 533,865

[22] Filed: Sep. 26, 1995

[30] Foreign Application Priority Data

Sep. 30, 1994 [JP] Japan ................................. 6-237049

[51] Int. Cl.$^6$ ................................. H04Q 1/00; H04B 10/00
[52] U.S. Cl. ................................. 340/825.72; 340/825.69;
340/825.31; 340/825.34; 359/142; 359/154
[58] Field of Search ................................. 340/825.72, 825.69,
340/825.06, 825.07, 825.31, 825.34, 825.24,
825.54; 359/142, 154, 164, 167

[56] References Cited

U.S. PATENT DOCUMENTS

| | | | |
|---|---|---|---|
| 5,028,919 | 7/1991 | Hidaka | 340/825.72 |
| 5,182,551 | 1/1993 | Goto | 340/825.24 |
| 5,204,768 | 4/1993 | Tsakiris et al. | 359/148 |
| 5,260,701 | 11/1993 | Guern et al. | 340/825.54 |
| 5,365,225 | 11/1994 | Bachhuber | 340/825.31 |
| 5,455,959 | 10/1995 | Simmering | 395/800 |

*Primary Examiner*—Michael Horabik
*Assistant Examiner*—Yonel Beaulieu
*Attorney, Agent, or Firm*—Ronald P. Kananen

[57] ABSTRACT

A remote operating system including a remote operating device 20 having the transmitting/receiving function and a learning function, a slave unit 30 provided in any of a variety of main body members of the electronic equipment remote-operated by the remote operating device, and a master unit 10 for the slave unit. An identification code generating circuit 11 of the master unit 10 generates an identification code as the identification information. The master unit 10 transmits the identification code from a transmitter 13 to the remote controlling unit 20 by an IR beam, while transmitting the identification code from a sender/receiver 14 over a cable to the slave unit 30. The remote operating unit 20 appends the identification code associated with an operating switch 21 to form a remote operating signal which is transmitted to the slave unit 30. The slave unit 30 collates the identification code contained in the remote controlling signal to the identification code transmitted over the cable and stored in a storage unit 34. With the remote operating system, security in remote control may be improved.

4 Claims, 8 Drawing Sheets

| HEADER | PERSONAL ID CODE | FUNCTIONAL CODE | CHECK SUM |
|---|---|---|---|

FIG.6

REMOTE OPERATING SYSTEM

BACKGROUND OF THE INVENTION

This invention relates to a remote operating system including a remote operating device having a transmitting/receiving function and a learning function, a slave unit provided in any of a variety of main body members of the electronic equipment remote-operated by the remote operating device, and a master unit for the slave unit.

Up to now, it has been customarily practiced to receive a remote operating signal of a fixed pattern transmitted from a master unit as a transmitter by a remote operating device fitted with a transmitting/receiving function and a learning function and to transmit the received signal from the remote operating device to a slave unit as a receiver provided on, e.g., an electronic equipment for remote operating the electronic equipment.

Referring to FIG. 1, the conventional remote operating system includes a master unit 60 having a transmitter 62 for transmitting a remote operating signal of a fixed pattern shown in FIG. 2 under control of a Controller 61. The system also includes a remote operating device 70 having a transmitting/receiving function and a learning function and slave unit 80. The remote operating device 70 has a storage 75 for storing the remote operating signal from the transmitter 62 received by a receiver 73 via a controller 72, and a transmitter 74 for transmitting the remote operating signal fetched from the storage 75 responsive to actuation of a key switch actuated by an actuating switch 71. The slave unit 80 has a controller 82 for controlling electronic equipment, not shown, responsive to the remote operating signal from the receiver 74 received by a receiver 81.

However, since it is not possible with the above-described conventional remote operating system to have a large number of patterns of remote operating signals, by reason of the storage capacity of the storage 75 of the remote operating device 70, there is no alternative but to employ, e.g., IR signals of a fixed pattern at all times.

Thus the codes may be duplicated by a remote operating device having the learning function. On the other hand, there is no means for protection in case of unauthorized use of the remote operating device itself.

SUMMARY OF THE INVENTION

It is therefore an object of the present invention to provide a remote operating system capable of improving security in remote operation.

According to the present invention, there is provided a remote operating system including a remote controlling device, a master unit, and a slave unit. The remote controlling device has receiving means for receiving at least the identification information, storage means for storing the received identification information, controlling means for taking out the identification information stored in the storage means and for appending a functional code of causing an object of remote operation to perform a pre-set operation, for generating a remote controlling signal, and transmission means for transmitting the remote operating signal. The master unit has identification information generating means for generating the identification information and transmitting means for transmitting the identification information. The slave unit has receiving means for receiving the remote operating signal from the remote operating device and the identification information from the master unit, storage means for storing the identification information received from the master unit and collation means for collating the identification information contained in the remote operating signal received by the remote operating device to the identification information stored in the storage means.

Preferably, an infrared light is transmitted and received in the remote operating device.

Preferably, the master unit and the slave unit are unified together.

Preferably, the identification information may be optionally modified. That is, the identification information is newly modified and generated when the remote operating device is to be in use. The identification information may be variable and may be generated by random numbers.

With the remote operating system according to the present invention, the identification information generated by the master unit by the identification information generating means is transmitted to the remote operating device and to the slave unit. Consequently, when the remote operating device transmits a remote operating signal, comprised of the identification information appended to the functional code, to the slave unit, it becomes possible for the slave unit to collate the identification information from the master unit, pre-stored in storage means, to the identification information appended to the remote operating signal by collating means.

Thus it becomes possible with the remote operating system of the present invention to prohibit the remote operating system from being copied by another remote operating device having the learning function. The system management is not significantly obstructed even if the remote operating device itself is employed by an unauthorized user, thus enabling the remote control system to be improved in security.

BRIEF DESCRIPTION OF THE DRAWINGS

FIG. 6 shows the format of an IR remote-controlling signal employed in the remote operating system shown in FIG. 3.

DESCRIPTION OF THE PREFERRED EMBODIMENT

Figure 1:
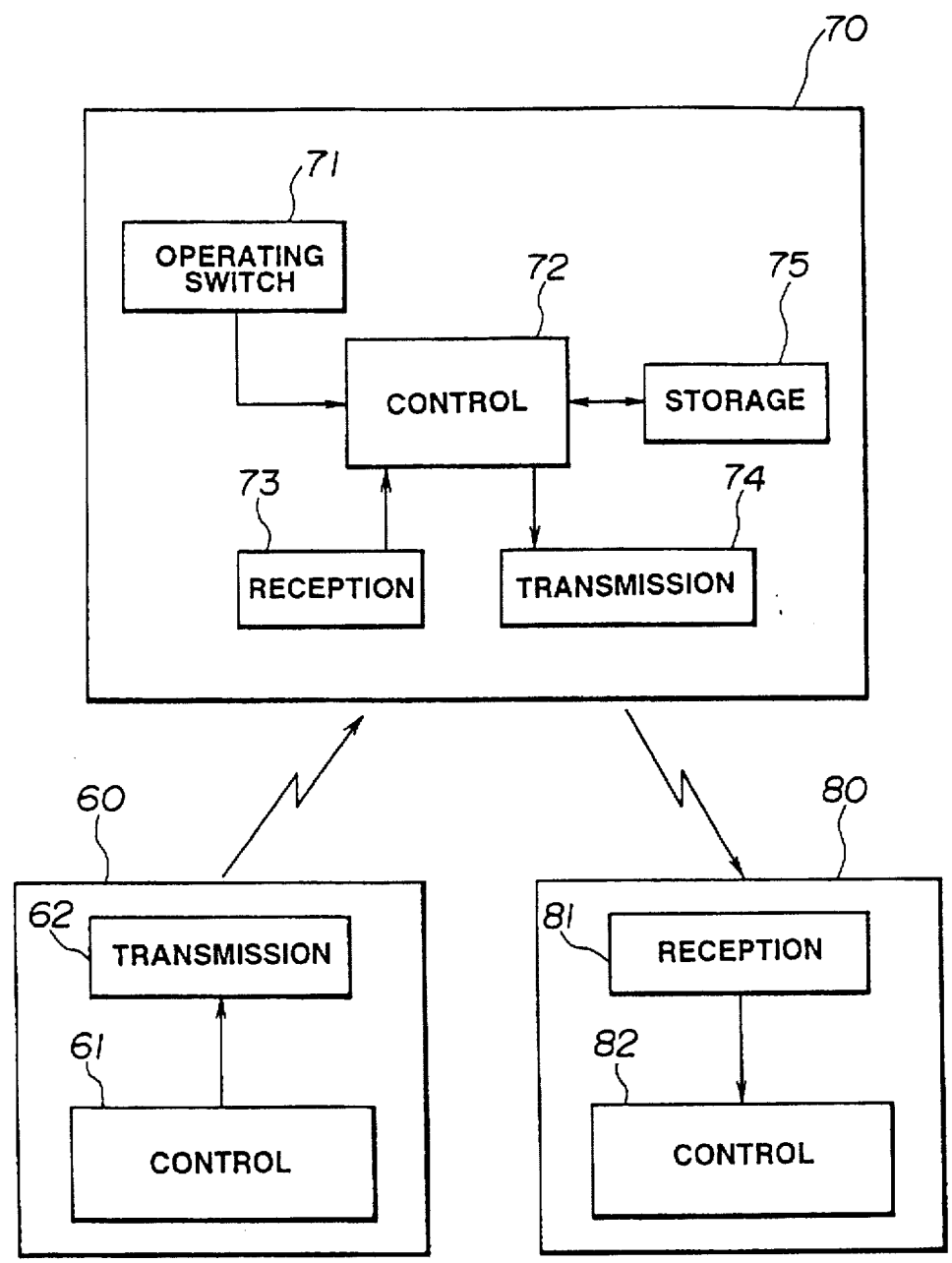
FIG. 1 is a block diagram of a conventional remote operating system.
Figure 2:
FIG. 2 shows the format of an IR remote controlling signal employed in the conventional remote operating system.

Referring to the drawings, a preferred embodiment of a remote operating system according to the present invention is explained in detail.

Figure 3:
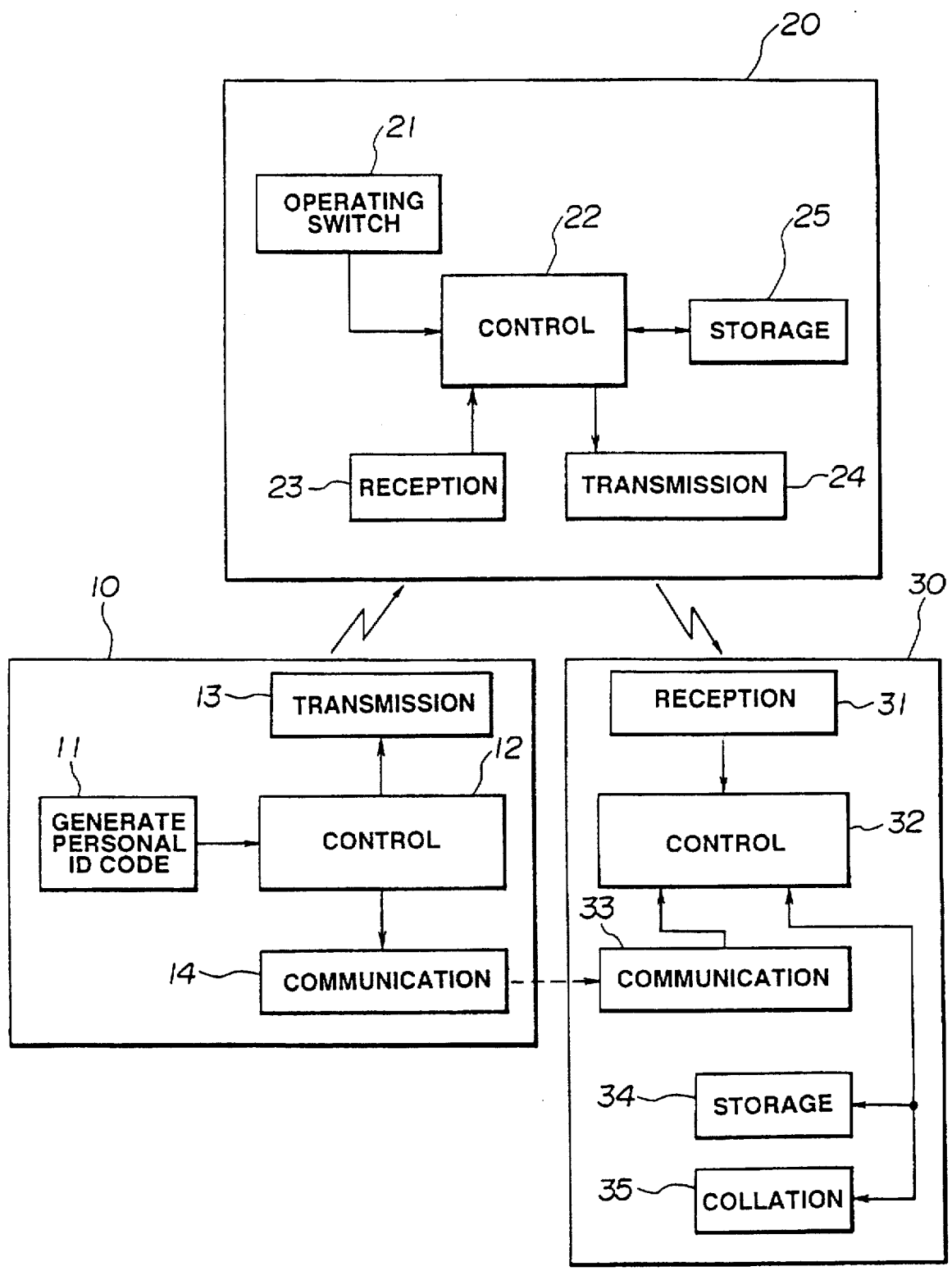
FIG. 3 is a block diagram of a remote operating system embodying the present invention.

The remote operating system is made up of a master unit 10, a remote operating device 20, and a slave unit 30, as shown in FIG. 3.

The master unit 10 is a transmitting device made up of an identification code generating circuit 1t for generating an identification code as the identification information by random numbers, a transmitter 13 for transmitting the identification code to the remote operating device 20 by an infra-red (IR) beam under control by a controller 12, and a sender/receiver 14 for transmitting the personal identification code over a cable (dotted line illustration) to the slave unit 30 under control of the controller 12.

The remote operating device 20 includes a receiver 23 for receiving the IR personal identification code from the transmitter 13 of the master unit 10, and a storage 25 for storing the personal identification code under control of a controller 22. The remote operating device 20 also includes a sender/receiver 24 for appending the identification code taken out at the storage 25 to a functional code associated with a key switch actuated by an actuating switch 21 and for sending the resulting signal to the slave unit 30 under control of the controller 22.

The slave unit 30 includes a receiver 31 for receiving the remote operating signal transmitted from the transmitter 24, and a sender/receiver 33 for receiving the identification code transmitted over a cable from the transmitter 14 of the master unit 10. The slave unit 30 also includes a storage 34 for storing the personal identification code from the sender/receiver 33 under control of the controller 33 and a collator 35 for collating the identification code contained in the remote operating signal to the identification code stored in the storage 34. The operation of the remote operating system of the illustrated embodiment is hereinafter explained by referring to FIGS. 4 to 7.

Figure 4:
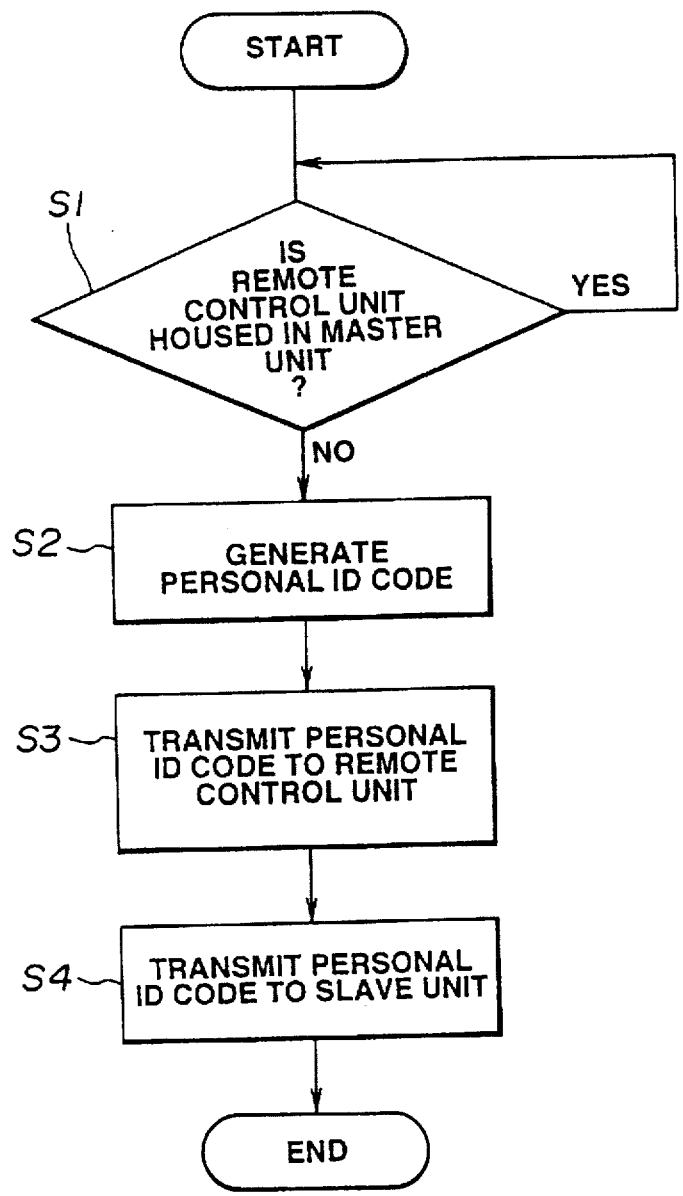
FIG. 4 is a flow chart showing the operation of a master unit constituting the remote operating system shown in FIG. 3.

The master unit 10 performs operations as shown in the flowchart of FIG. 4.

On starting the operating sequence of the flowchart, the controller 12 judges at step S1 whether or not the remote operating device 20 is contained in the master unit 10. The master unit 10 includes a housing section (not shown) for housing the remote operating device 20 and electrical or mechanical means for sensing the loading/unloading of the remote controlling device 20. If the result is NO, that is, if the controller 12 judges that the remote controlling device 20 is not housed within the master unit 10, the controller 12 transfers to step S2.

At step S2, the identification generating circuit 11 generates the identification code. This identification code is the discrimination information and may be newly generated at the start time of using the system while it may also be modified optionally. The identification code may be generated by, e.g., random numbers.

At step S3, the transmitter 13 transmits the identification code to the remote operating device 20 under control by the controller 12.

At step S4, the sender/receiver 14 transmits the personal identification code to the slave unit over a cable under control by the controller 12. The operating sequence now comes to a close and is again started when the remote operating unit is housed within the master unit.

Figure 5:
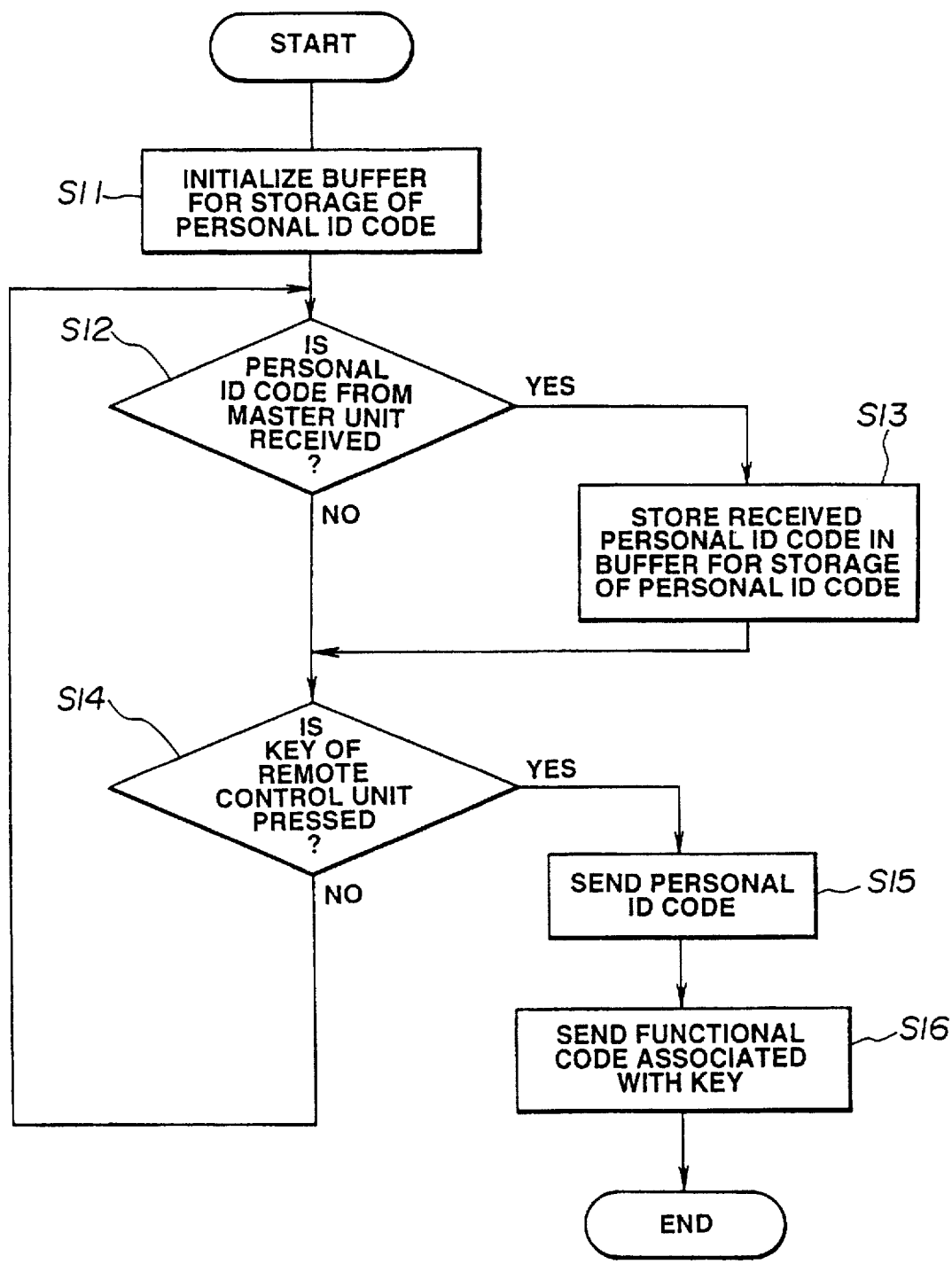
FIG. 5 is a flow chart showing the operation of a remote operating device constituting the remote operating system shown in FIG. 3.

The remote operating device 20 performs operations shown in the flowchart of FIG. 5.

On starting the operating sequence of the flowchart, the controller 22 initializes an identification code storage buffer at step S11, and causes a default value to be stored therein.

At step S12, the controller 22 judges whether or not the identification code has been received by the receiver 23. If the result is YES, that is if the controller judges that the receiver 23 has received the identification code, the controller transfers to step S13. If the result is NO, that is if the controller judges that the receiver 23 has not received the personal identification code, the controller transfers to step S14.

At step S13, the received identification code is stored in the storage 25, that is an identification code storage buffer.

At step S14, the controller 22 judges whether or not the user has pressed a key of the actuating switch 21. If the result is YES, that is if the controller judges that the key has been pressed, the controller 22 transfers to step S15. If the result is NO, that is if the controller judges that the key has not been pressed, the controller 22 reverts to step S12.

At step S15, the identification code is fetched from the storage 25, that is a personal identification code storage buffer. The identification thus fetched is transmitted by the transmitter 24 to the slave unit 30. At step S16, the functional code associated with the key is transmitted from the transmitter 24 to the slave unit 30. The operating sequence then comes to a close.

The identification code and the functional code, shown between the steps S15 and S16, are arrayed between the header information and the check sum, and are transmitted from the transmitter 24 to the slave unit 30 as the remote-controlling signal, as shown in FIG. 6.

Figure 7:
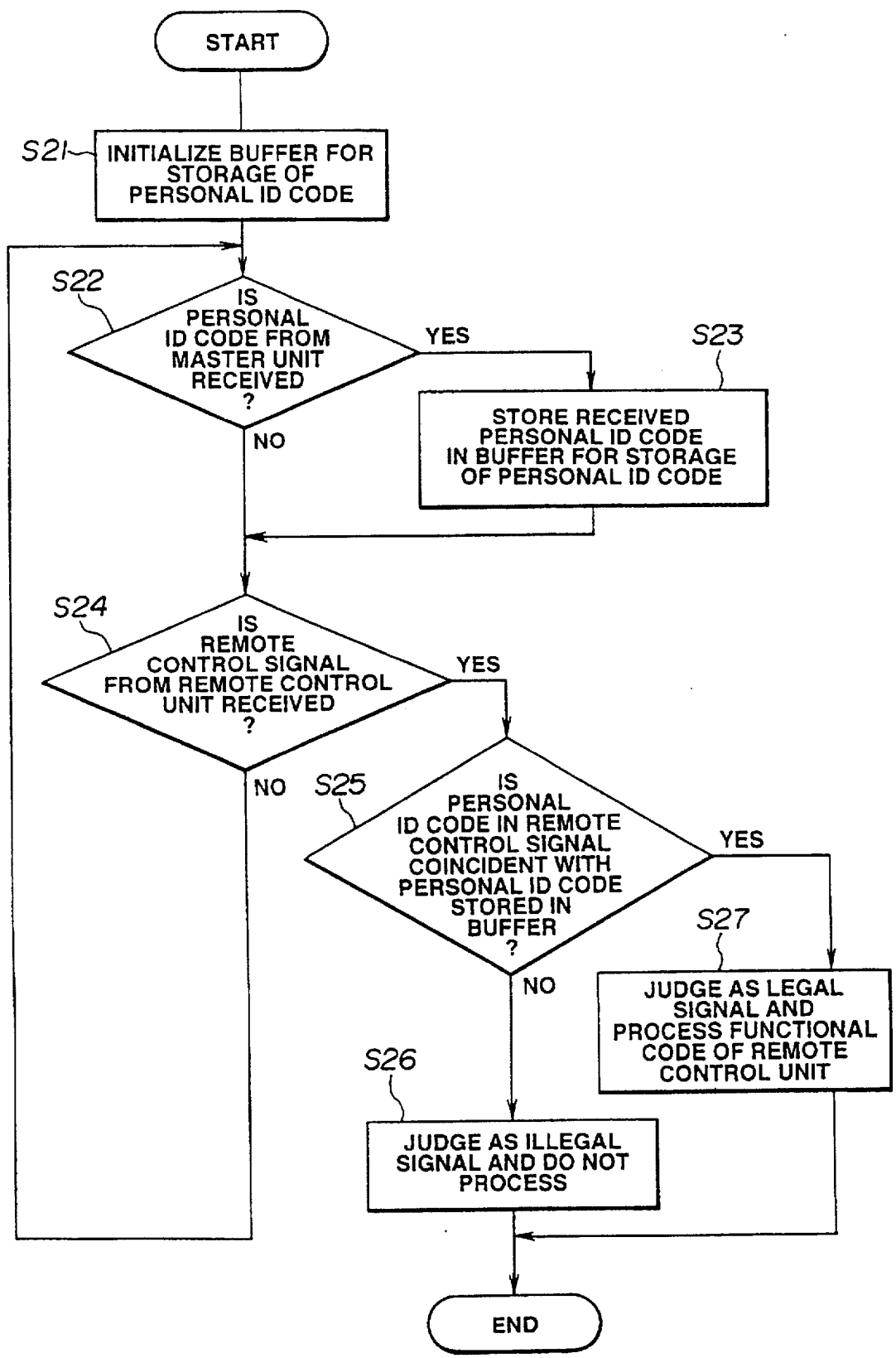
FIG. 7 is a flow chart for illustrating the operation of a slave unit constituting the remote operating system shown in FIG. 3.

The slave unit 30 performs operations as shown in the flowchart of FIG. 7.

On starting the operating sequence of the flowchart, the controller 32 initializes an identification code storage buffer at step S21, and causes a default value to be stored therein.

At step S22, the controller 32 judges whether or not the personal identification code from the master unit 10 has been received by the sender/receiver 33 over the cable from sender/receiver 14 of the master unit 10 therefor. If the result is YES, that is if the controller 32 judges that the sender/receiver 33 has received the identification code, the controller 32 transfers to step S23. If the result is NO, that is if the controller judges that the sender/receiver 33 has not received the identification code, the controller transfers to step S24.

At step S23, the personal identification code received by the sender/receiver 33 over a cable is stored in the storage 25, that is the identification code storage buffer.

At step S24, the controller 32 judges whether or not the receiver 31 has received the remote controlling signal from the remote controlling device 20. If the result is YES, that is if the controller 32 judges that the remote controlling signal has been received, the controller 32 transfers to step S25. If the result is NO, that is if the controller 32 judges that the remote controlling signal has not been received, the controller 32 reverts to step S22.

At step S25, the controller 32 judges, with the aid of the collator 35, whether or not the identification code contained in the remote controlling signal is coincident with the personal identification code stored in the storage 25, that is the identification code storage buffer. If the result is YES, that is if the controller judges that the two codes coincide with each other, the controller transfers to step S27. If the result is NO, that is if the controller judges that the two codes are not coincident with each other, the controller transfers to step S26.

At step S27, the controller 32 judges that the remote controlling signal transmitted from the remote controlling device 20 is a correct signal, and causes an electronic equipment, not shown, to execute processing suited to the functional code.

At step S26, the controller 32 judges that the remote controlling signal transmitted from the remote controlling device 20 is an illicit signal, and allows no processing to be executed by the electronic equipment.

If the steps S26 or S27 are completed, the operating sequence of the flowchart comes to a close.

Figure 8:
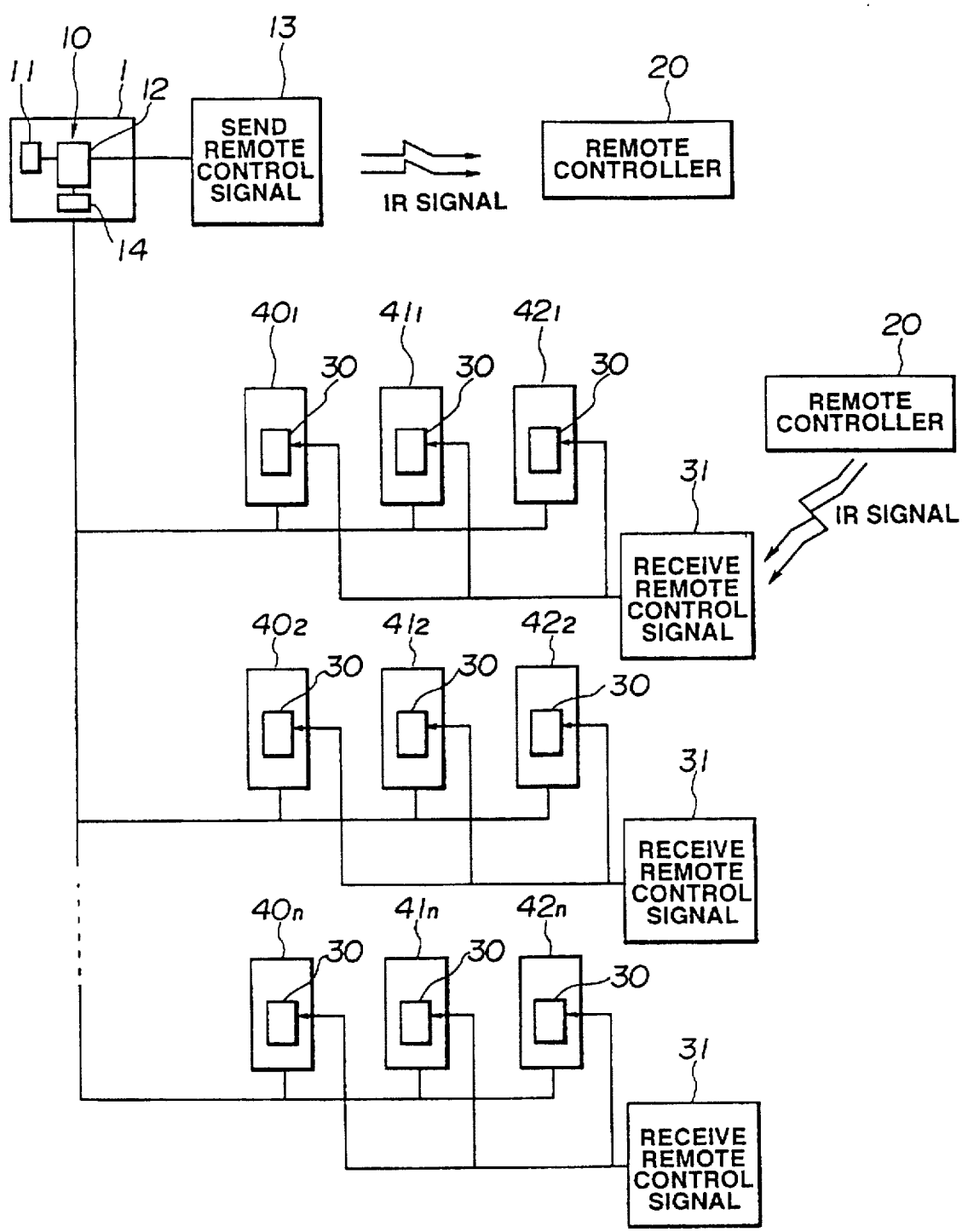
FIG. 8 shows an illustrative example of applying the remote operating system shown in FIG. 3 to a speech distribution system for an aircraft.
Figure 9A:
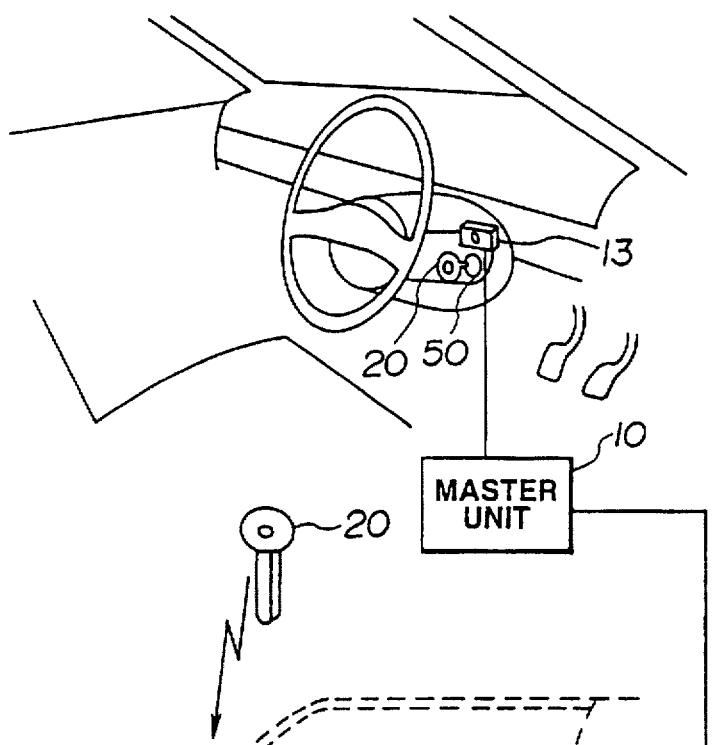
FIGS. 9A and 9B show an illustrative example of applying the remote operating system shown in FIG. 3 to a key-less entry system for an automobile.

Referring to FIGS. 8 and 9, an illustrative embodiment of the remote operating system is explained.

The embodiment shown in FIG. 8 is the application of the remote operating system to a speech distribution system for furnishing the speech information, such as audio information, to the passengers seated in an aircraft. The speech distribution system has plural channels and is capable of furnishing the program of a desired channel to the passenger according to his or her liking. It is also possible to set one or more of the channels as payable channels and to furnish special programs to the passenger subject to payment of prescribed fee. The remote operating system is employed when the program of the payable channel is to be furnished to the passenger.

In the present embodiment, a master unit 10 is mounted on a controller 1 actuated by the crew in charge and a slave unit 30 is mounted in each of operating panels for passengers $40_1$, $41_1$, $42_1$, $40_2$, $41_2$, $42_2$, ... $40_n$, $41_n$, $42_n$. The remote controlling device 20 is actuated by the crew for furnishing the program of the payable channel to a passenger who has paid the fee.

The operating panels for passengers $40_1$, $41_1$, $42_1$, $40_2$, $41_2$, $42_2$, ... $40_n$, $41_n$, $42_n$ are attached to e.g., arm portions of seats for three passengers. A remote-controlled receiver 31 is provided for each of groups of three seats. Thus it is necessary for the remote controlling device 20 to have the identification information for respective seats of the groups of three seats in addition to the identification codes and the functional codes. For the groups of seats for three passengers, the identification information will be the information such as "aisle", "window", and "center". Thus an operating panel for passenger performs the role of processing the functional code for furnishing the speech signals from the payable channel to the passenger if the identification information for each seat of the group of seats is coincident with its own identification information and the identification codes are also coincident.

If it is supposed that the operating panel for passenger $40_1$ is provided at the window side seat, and the passenger seated therein has placed a request to hear a program of a payable channel, such as a channel 10, the present device operates as follows:

The passenger in the window side seat pays the fee and advises the crew in charge of his or her intention of hearing the program of channel 10 which is the payable channel. The crew then takes out the remote controlling device 20 housed in the master unit 10 installed in the control device 1. The master unit 10 then generates an identification code, such as a code "1234", and causes the remote controlling unit 13 to transmit the code as IR signal to the remote controlling device 20. The master unit 10 transmits the identification code "1234" over a cable to the master unit 30. The remote controlling unit 20 causes the received identification code "1234" to the storage 25, that is a personal identification code storage buffer. The crew brings the remote controlling unit 20 to near the remote controlled receiving unit 31 and presses a switch "WINDOW" and a switch "PERMIT HEARING PAYABLE CHANNEL". The remote-controlling device 20 takes out the identification code "1234" from the storage 25, that is the identification code storage buffer, and appends the identification code "1234" to the functional codes of the information "WINDOW" and "PERMIT HEARING PAYABLE CHANNEL". The remote controlling device 20 sends the resulting data to the slave unit 31 as the IR remote controlling signal. The operating panels for passengers $40_1$, $41_1$, $42_1$ collate the identification code "1234" contained in the remote controlling signal from the remote controlling device 20 to the identification code "1234", which is received from the master unit 10 over a cable and which has been stored in the storage 34 that is the identification code storage buffer, by the collator 35, with the aid of the respective slave unit 30, 30, 30. The operating panels for passengers $40_1$, $41_1$, $42_1$ judge whether or not their own identification information is coincident with the identification information contained in the remote controlling signal. Thus it is possible for only the operating panel for passenger $40_1$ mounted on the window side seat to supply the program of the payable channel to the passenger.

Thus it becomes possible with the present embodiment to prevent the remote-controlling signal from being copied by another remote controlling device having the learning function. On the other hand, the system itself cannot be used illicitly if the remote controlling device should be used by an unauthorized user, thus improving security in remote control.

In an illustrative embodiment, shown in FIG. 9, the remote operating system is applied to a key-less entry system for an automobile. With the key-less entry system, a receiver/transmitter for IR signals is built into a key for an automobile and door lock is released by an IR remote controlling signal.

Figure 9B:
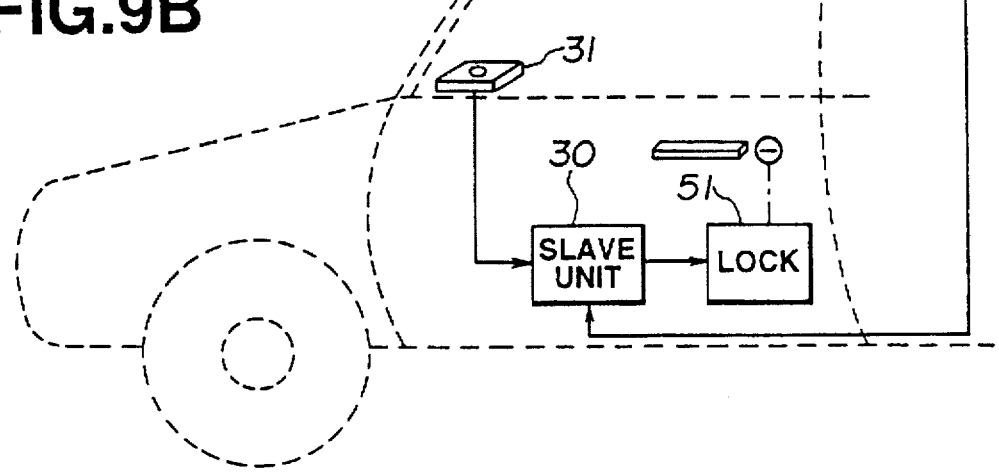

In the present embodiment, a remote controlled receiver, a transmitter and a storage are provided in a key (remote controlling device 20) shown in FIG. 7. A transmitter 13 and a master unit 10 are arranged near a keyhole 50. When the key 20 is withdrawn form the keyhole 50, the master unit 10 detects the pressing of a button (not shown) provided in the vicinity of the keyhole. The master unit 10 generates an identification code which is transmitted by the transmitter 13 to the key 20. The key 20 receives the identification code by the remote controlling device and stores it in a storage. The slave unit 30 is provided in a door lock device 51, as shown in FIG. 9B. This door lock device 51 locks and unlocks the door under control by the slave unit 30. The identification code is transmitted from the master unit 10 to the slave unit 30 at a timing of withdrawing the key 20 from the keyhole 50 and stored in the storage.

For unlocking the door, the identification code is appended to the functional code "unlock" obtained on pressing an associated switch (not shown) on the key 20, and the resulting signal is transmitted to the remote controlling device 31 from outside the vehicle. The slave unit 30 then collates the identification code previously supplied from the master unit 10 and stored in the storage to the identification code from the key 20. If coincidence in the identification codes is confirmed, the processing corresponding to the functional code "unlock" is performed on the lock device 51. This releases the door lock. If coincidence in the identification codes is not confirmed, door lock is not released and the door remains to be locked.

Thus, in the present illustrative embodiment, illicit unlocking by duplication of the functional code by an unauthorized party may be prohibited from occurring, thereby improving security in remote control.

The remote controlling system of the present invention is not limited to the above embodiment. For example, the master unit and the slave unit may be unified to each other.

The remote operating system according to the present invention may be applied to remote operation of a TV receiver or a video monitor employed in an exhibition hall or on a street. Since the range of the remote controlling signal of the IR remote controlling device is short, due to the property of the IR rays, the device can be applied to a limited space as encountered within domestic use if a large number of the same version of the TV receivers and video monitors are installed in e.g., an exhibition hall, the operation of the conventional remote controlling device employing the same code is disturbed due to interference of the remote controlling signals. Since it is possible with the present remote controlling system to use different identification codes for assuring one-for-one correspondence between the master and slave units, the remote controlling device may be employed under the above-described conditions.

It is possible with the present invention to prevent the identification code from being intercepted by carrying out transmission of the identification code from the master unit to the slave unit over a cable. However, the present invention may also be applied to the case of radio transmission of the identification codes. The identification code may be scrambled for transmission and the identification code decoded using a key pre-set on the slave unit side for improving security.

What is claimed is:

1. A remote control system for commanding at least one predetermined function in a slave unit, the system comprising:

a user-operable remote control unit for effecting a controlled function in at least one slave unit;

a master control unit having means for generating a unique identification code and for communicating the identification code to the user-operable remote control unit and to said at least one slave unit;

the remote control unit having means for receiving and storing the identification code communicated from the master control unit, means for generating a remote operating signal that includes a function code for executing a user-requested function and the stored ID code, and means for transmitting the remote operating signal over a first communications pathway to said at least one slave unit;

the said at least one slave unit having a first means for receiving the remote operating signal including the identification code and a functional code from the remote control unit via the first communications pathway and having a second means for receiving the identification code from the master control unit via a second communications pathway, the slave unit having means for storing the identification code received via the second communications pathway and for collating the stored identification code with the identification code received via the first communications pathway, the slave unit executing the function commanded by the function code upon successful collation of the identification code received via the first communications pathway and the stored identification code received via the second communications pathway;

the master unit providing another unique identification code to the remote control unit and to the slave unit as a function of the use of the remote control unit.

2. The remote control system of claim 1 wherein the second pathway is wire cable.

3. The remote control system of claim 1 wherein the first pathway is an infrared pathway.

4. The remote control system of claim 1 wherein the master unit provides another unique identification code to the remote control unit and to the slave unit as a function of each successive use of the remote control unit.

* * * * *